April 3, 1934.  J. KRAKORA, JR  1,953,683
AIR DEFLECTOR FOR VEHICLES
Filed July 18, 1930   2 Sheets-Sheet 1
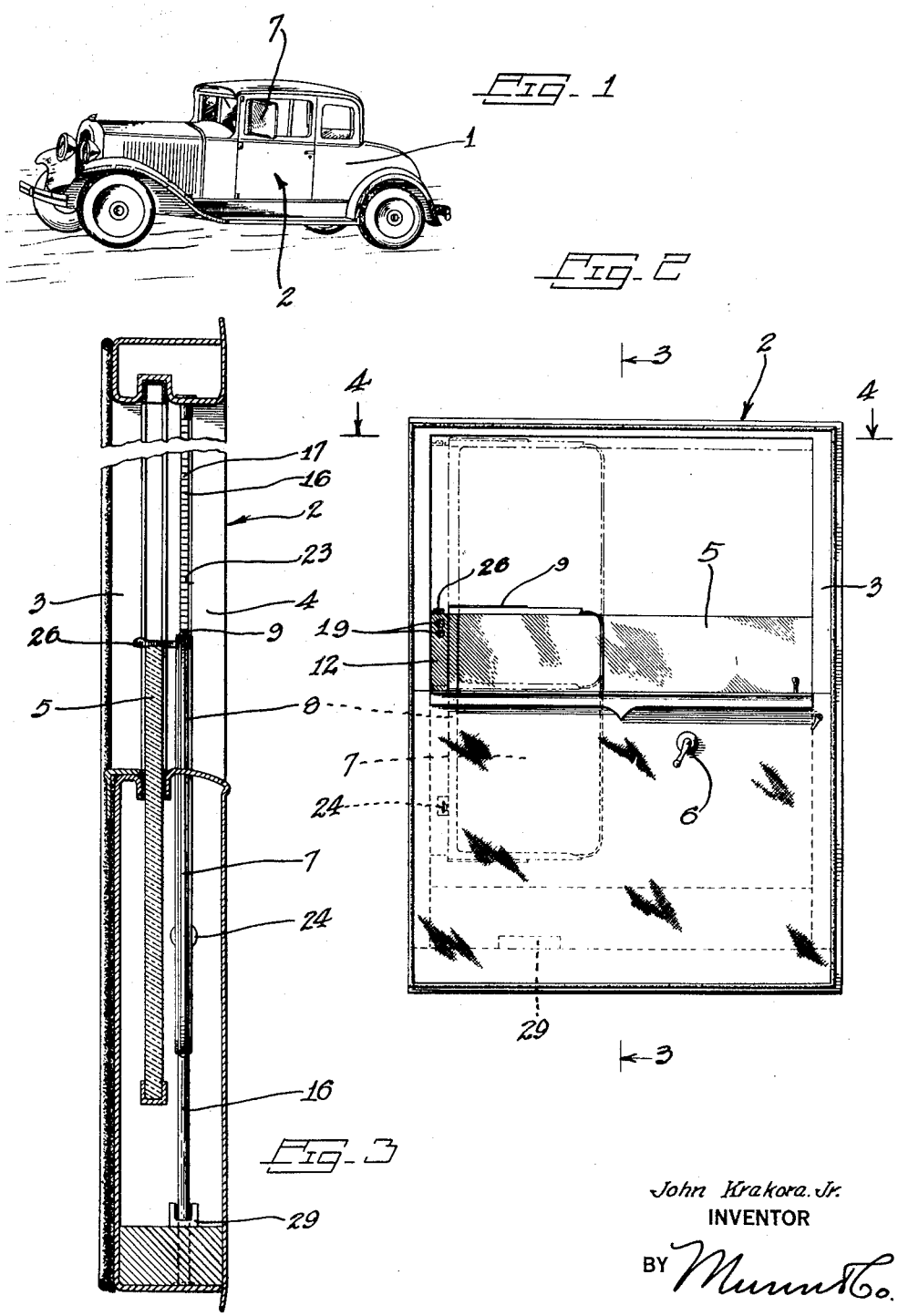
John Krakora, Jr.
INVENTOR
BY *Munn & Co.*
ATTORNEYS April 3, 1934. J. KRAKORA, JR 1,953,683
AIR DEFLECTOR FOR VEHICLES
Filed July 18, 1930 2 Sheets-Sheet 2
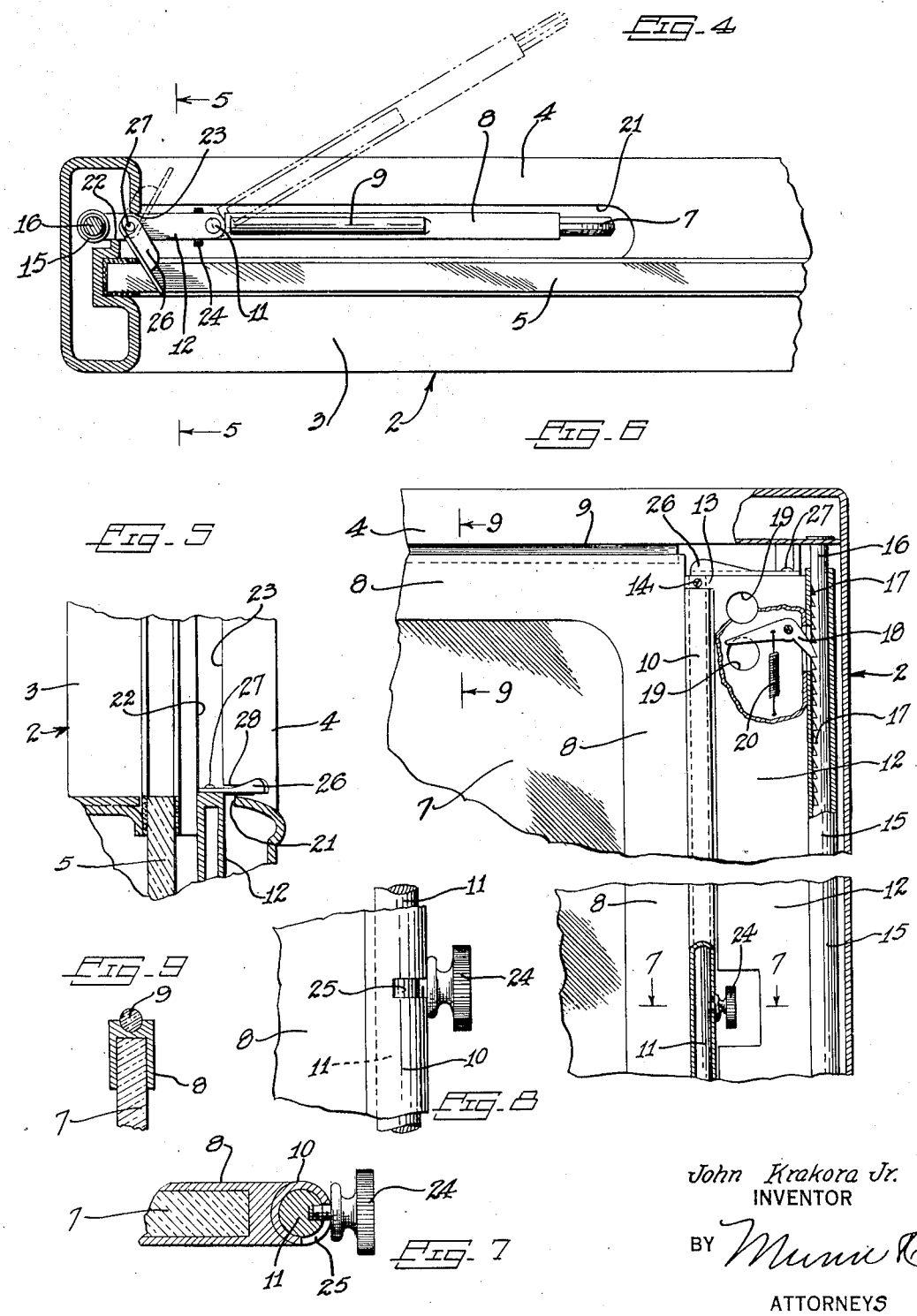

UNITED STATES PATENT OFFICE 1,953,683

AIR DEFLECTOR FOR VEHICLES

John Krakora, Jr., Park Ridge, Ill.

Application July 18, 1930, Serial No. 468,935

4 Claims. (Cl. 296—44)

My invention relates to improvements in air deflectors for vehicles, and it consists in the combinations, constructions, and arrangements herein described and claimed.

An object of my invention is to provide an air deflector for vehicles of a type adapted to be associated with a door which forms a part of the vehicle, and in which means is provided whereby the air deflector may be easily and quickly adjusted to various positions and moved to an invisible position within the door when desired.

A further object is to provide a device of the type described in which an air deflecting mechanism may be associated with a vehicle door employing a movable glass, and in which the air deflecting mechanism is so associated with the door glass that the former may be moved from a position within the door when the door glass is moved.

A further object is to provide a device of the type described which may be easily and quickly disposed within the framework of a vehicle door, and in which means is employed whereby the device may be quickly moved to the exterior of the door frame and adjusted in various positions for air deflecting purposes.

Other objects and advantages will appear in the following specification, and the novel features of the invention will be particularly pointed out in the appended claims.

My invention is illustrated in the accompanying drawings, forming part of this application, in which Figure 1 is a perspective view of a vehicle embodying my invention, Figure 2 is an elevation of a vehicle door showing my invention applied thereto, Figure 3 is a sectional view taken along the line 3—3 of Figure 2, Figure 4 is a sectional view taken substantially along the line 4—4 of Figure 2, Figure 5 is a sectional view taken along the line 5—5 of Figure 4, Figure 6 is an enlarged detail view of a portion of my invention, Figure 7 is a sectional view taken along the line 7—7 of Figure 6, Figure 8 is an enlarged detail view of a portion of my device, and Figure 9 is a sectional view taken along the line 9—9 of Figure 6.

In carrying out my invention, I make use of a vehicle 1 provided with a door 2. The vehicle is of course provided with a door upon each side. The door 2, as will be seen from Figures 2 and 3, comprises a frame 3 having an opening 4 arranged to be closed by means of a door glass 5. This construction of course conforms to the many standard door constructions now employed in connection with power propelled vehicles such as the automobile.

The door glass may be raised or lowered by means of a crank 6 which is situated upon the inside of the door. My invention comprises an air deflecting plate 7, see Figure 1, which is associated with the door 2 in such a manner that air may be deflected as when the vehicle is moving. The plate 7 is preferably made from glass material and may be adjusted to various positions. The plate may of course be made from any suitable material other than glass.

The plate, see Figures 2, 3, and 6, is supported by an auxiliary frame 8. The auxiliary frame is channel shaped in cross section, as will be noted in referring to Figure 9, for receiving the edges of the glass. The frame preferably receives the forward upper and lower edges of the plate, as will be noted in Figure 1. The upper and lower edges of the frame are provided with flexible beads 9, preferably rubber, which are arranged to engage the upper and lower edges of the opening in the door when the plate 7 is swung outwardly. The beads 9 tend to frictionally hold the plate against movement and at the same time provide a desirable amount of rigidity and shock absorbing qualities.

The auxiliary frame 8 is provided with a tubular member 10 which is disposed upon a rod or shaft 11. The ends of the latter are connected with a slidable air deflector support 12. The plate 7 and its associated auxiliary frame constitute the deflector. The support 12 is provided with projections 13 upon its ends for receiving the ends of the rod 11. The rod may be firmly secured against movement by means of pins 14. Other suitable means such as welding may be employed for securing the rod. The support 12 is preferably formed from sheet material for providing a hollow construction. This tends to eliminate a great amount of weight. The support may, however, be formed from a solid piece of material. One edge of the support is provided with a tubular guide 15 which is slidably mounted upon a guide rod 16 carried by the frame of the door.

The guide rod is preferably provided with a plurality of teeth 17 which may be engaged by a pawl 18 carried by the support 12. The support is provided with a pair of openings 19, whereby the pawl may be manipulated manually. The pawl is normally held in engagement with the guide rod 16 by means of a spring 20. The pawl may be lifted against the tension of the spring when it is desired to move the pawl out of engagement with the teeth 17. The pawl, when in engagement with the teeth, prevents the deflector from downward movement. The deflector must of course be aligned with an auxiliary slot 21, see Figure 4, before it can be lowered into the door frame. The openings 19, in addition to permitting access to the pawl 18, also provide a convenient means whereby the deflector may be raised and lowered manually. In referring to Figure 4 it will be noted that the door frame comprises in part edges 22 and 23, against which the support 12 bears. The relation is such that the support may be easily moved upwardly or downwardly, but is effectively held against a swinging movement upon the sliding rod 16.

While the beads 9 may suffice for frictionally holding the deflector in various adjusted positions, it may be desirable to provide other means for positively securing the deflector in its adjusted position. To this end I have provided a thumb screw 24, see Figure 8, which is carried by the rod 11 and passes through a slot 25 in the tubular member 10. The thumb screw may be loosened slightly, at which time the tubular member may be freely rotated upon the rod. When, however, the thumb screw is turned down, the tubular member is firmly secured upon the rod so that the deflector is positively held against movement. The upper end of the frame 12 is provided with a locking element 26, see Figures 4 and 5, which is hingedly mounted upon the support, as at 27.

The door frame is provided with a recess 28 into which the locking member may be moved when the deflector is lowered. Thus it will be seen that the deflector, when disposed within the frame of the door, is rigidly supported against movement. Means for additionally supporting the deflector when lowered comprises a suitable pad 29, see Figures 2 and 3. The pad may be formed from any suitable resilient material. The deflector, when lowered, is firmly supported against movement.

From the foregoing description of the various parts of the device, the operation thereof may be readily understood. An important feature in connection with my invention is the fact that the deflector may be moved to a position within the door frame, without the necessity of detaching the deflector from the vehicle door or other support carried by the vehicle. In addition to this, the deflector may be easily lifted. When it is desired to lift the deflector, the locking member 26 may be shifted to the full line position shown in Figure 4. At this time the door glass 5 may be lifted slightly through the medium of the crank 6. The deflector may then be lifted manually by grasping the support 12 through the medium of the openings 19. The pawl 18 is constructed in such a manner that the deflector may be moved upwardly, but as soon as the deflector tends to move downwardly, the pawl engages the teeth 17 for holding the deflector against such movement. After the deflector has been lifted to align with the opening in the door, the deflector may be pushed outwardly about the longitudinal axis of the rod 11.

It will be noted in referring to Figure 6 that the support 12 has been cut out slightly to provide access to the thumb screw 24. After the deflector has been moved outwardly a desired distance, the thumb screw may be turned down for securing the deflector in its shifted position. Ordinarily, the beads 9 will hold the deflector against movement in various shifted positions. The construction is such that the device may be associated with vehicle doors of standard construction.

I claim:

1. The combination with a double walled vehicle door having a window frame provided with an auxiliary slot and a window pane adapted to be raised and lowered, of an air deflector adapted to pass through the slot into the space between the walls of the door, and means carried by the deflector and movable over the upper edge of the pane for causing the lifting of the deflector when the pane is raised.

2. The combination of a double walled automobile door having a window frame consisting of a top member, a bottom member having an auxiliary slot, and side members, of a rod disposed adjacent to and parallel with one of said side members, a support slidably carried on said rod, an air deflector hinged to said support and movable with said support through said auxiliary slot, and a spring actuated pawl member carried by the support and arranged to engage the rod to hold the support when the latter has been moved a predetermined distance.

3. The combination of a double walled automobile door having a window frame consisting of a top member, a bottom member having an auxiliary slot, and side members, of a rod disposed adjacent to and parallel with one of said side members, a support slidably carried on said rod, an air deflector hinged to said support and movable with said support through said auxiliary slot, and a spring actuated pawl member carried by the support and arranged to engage the rod to hold the support when the latter has been moved a predetermined distance, said support having finger openings for permitting manual movement of the support.

4. The combination of a double walled automobile door having a window frame consisting of a top member, a bottom member having an auxiliary slot, and side members, of a rod disposed adjacent to and parallel with one of said side members, a support slidably carried on said rod, an air deflector hinged to said support and movable with said support through said auxiliary slot, and a spring-actuated pawl member carried by the support and arranged to engage the rod to hold the support when the latter has been moved a predetermined distance, said support having finger openings for permitting manual movement of the support, one of said finger openings being positioned to permit access to the pawl for releasing the latter, whereby the support may be lowered.

JOHN KRAKORA, Jr.